(No Model.)
2 Sheets—Sheet 2.
J. H. JESSEN.
HORSESHOEING APPARATUS.
No. 551,287.  Patented Dec. 10, 1895.
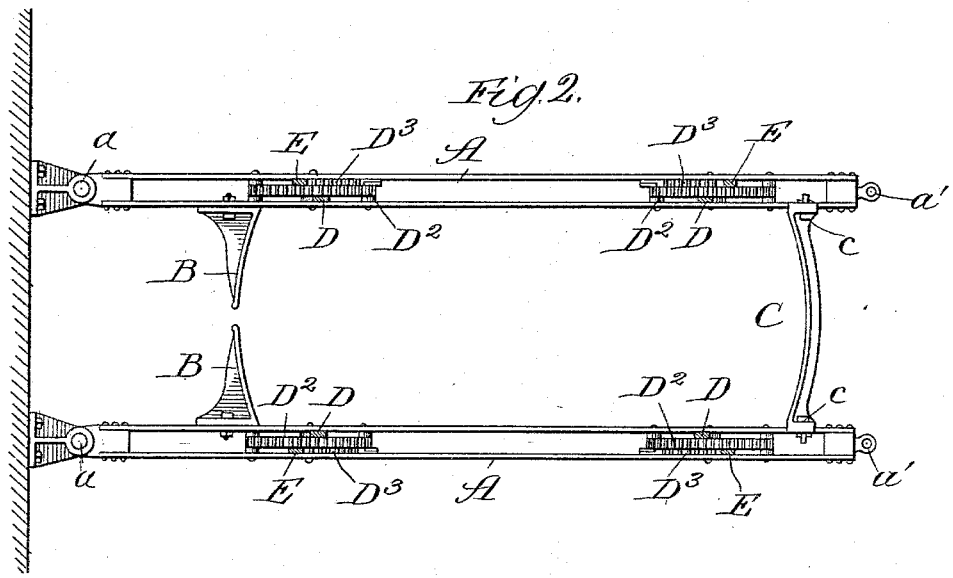
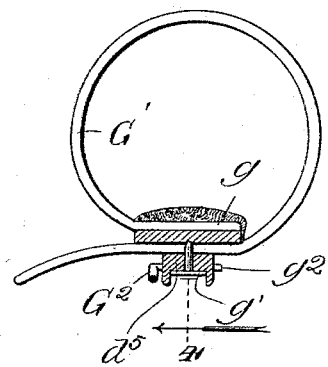
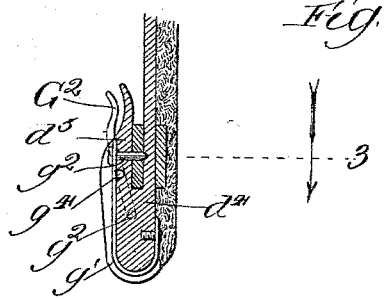
Witnesses:
Chas. E. Gaylord
Lute S. Alter
Inventor:
John H. Jessen,
By Banning & Banning & Sheridan,
Att'ys

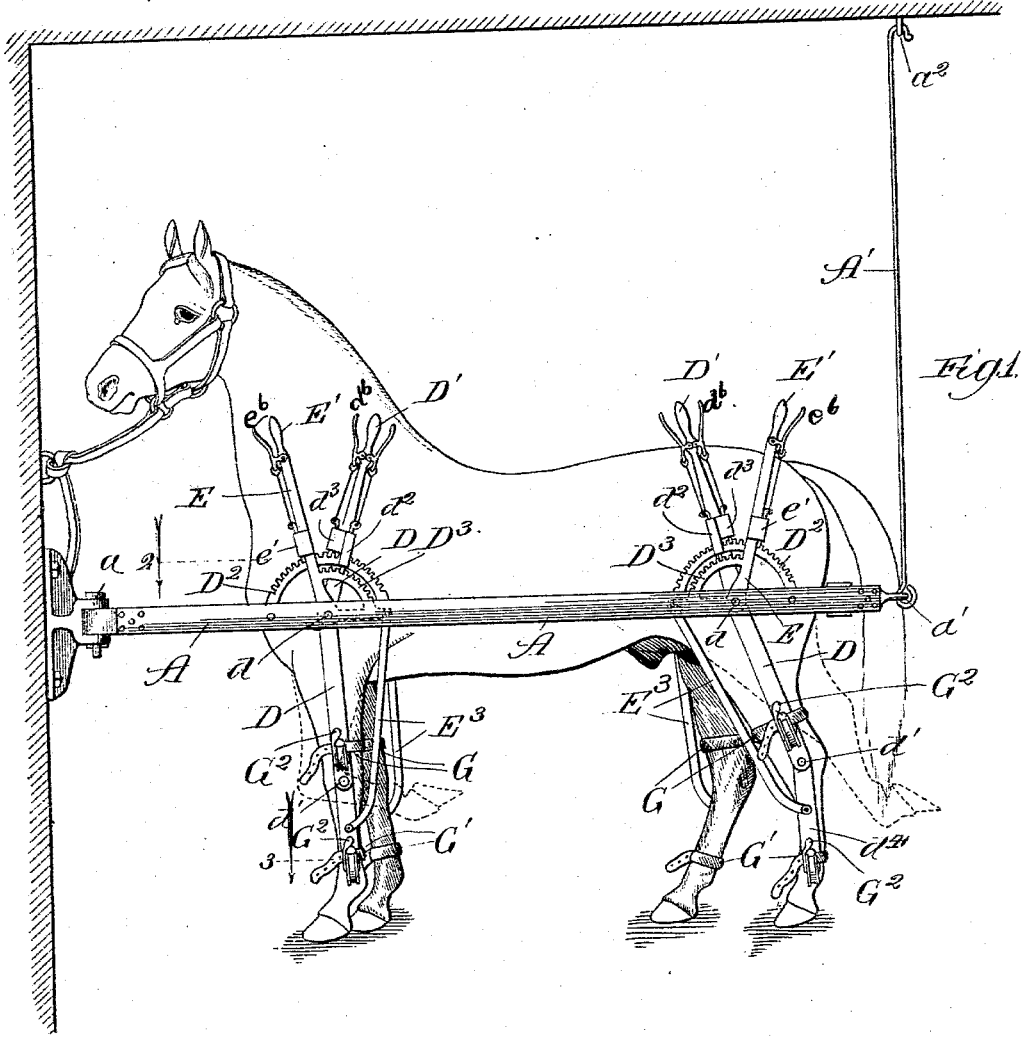

UNITED STATES PATENT OFFICE.

JOHN H. JESSEN, OF RENSSELAER, INDIANA, ASSIGNOR OF ONE-HALF TO GEORGE N. BARCUS, OF SAME PLACE.

HORSESHOEING APPARATUS.

SPECIFICATION forming part of Letters Patent No. 551,287, dated December 10, 1895.

Application filed March 19, 1895. Serial No. 542,359. (No model.)

*To all whom it may concern:*

Be it known that I, JOHN H. JESSEN, a citizen of the United States, residing at Rensselaer, Jasper county, Indiana, have invented certain new and useful Improvements in Horseshoeing Apparatus, of which the following is a specification.

The object of my invention is to provide a simple, economical and efficient apparatus by which a horse may be held with certainty and safety during the process of shoeing the animal; and the invention consists in the features and combinations hereinafter described and claimed.

In the drawings, Figure 1 is a side elevation of my improvement, showing the method of attaching the same to a horse; Fig. 2, a plan view of the mechanism, looking at it from the top; Fig. 3, an enlarged transverse view of a portion of the fastening devices, taken on line 3 of Fig. 1; and Fig. 4 an enlarged sectional view, taken on line 4 of Fig. 3.

In shoeing animals, especially horses, where the smith has to come in close proximity with the animal, it is oftentimes exceedingly dangerous—especially where a vicious animal has to be shod—and many times results in the smith being seriously injured by the kicks and struggles of the animal. Again, where large horses have to be shod, it is exceedingly tiresome and laborious work for the smith to have to hold the foot or leg of the animal, in addition to the work of nailing, clinching and setting the shoe. The operation of shoeing a horse is tiresome and irritating to the animal, as well as to the smith employed for the purpose. To avoid these, as well as other objections, and provide a simple, economical and efficient apparatus for holding a horse safely and to position its limbs and firmly secure them during the process of setting, nailing and clinching the shoe, is the principal object of my invention.

In constructing my improvement, I preferably provide two sets of bars A A, which are hinged in any desired position to the walls of the building at $a$, so that when they are not in use they may be swung back against the sides of the building. To hold them in their operative position, I provide the outer free ends with eyes $a'$, in which may be pivoted stay-bolts $A'$, having hooked upper ends adapted to be engaged with I-bolts $a^2$, in the walls of the building, so that when they are in such engaged position, as shown in Fig. 1, the apparatus is held firmly in operative position. These bars A A form what I term a "supporting-frame portion," to which I will hereinafter refer by such name in the specification and claims.

To properly position the animal, I provide projecting brackets B B, one on each portion of the frame, which brackets when in operating position rest against the breast of the animal, thereby limiting its forward motion. A connecting rod or bar C is secured by means of bolts or studs $c$ to the rear of the frame, near the free ends of both portions, so that when the animal is placed in position between the bars of the frame, this rear connecting rod or bar may be secured to both portions of the frame and the bolts or studs placed in position, thus making the frame practically and substantially one rigid portion. These securing-studs may be of any desired or usual form, so as to enable the operator to quickly insert or remove the same.

To hold the limbs of the animal in the proper position to be shod, I provide four sets of main compound levers D, which are provided with pivotal points located approximately at points corresponding to the joints of the animal, so that they may be moved in harmony therewith—that is, the levers proper are pivoted at $d$ near the hip and shoulder of the animal and again at $d'$ near the animal's knee, so that when the lever D assumes the bent position shown in the dotted line to the left of Fig. 1, the limb of the animal will be bent into the same position, thus securely and rigidly maintaining the limb in that position.

The main compound levers are provided with handle portions $D'$ and latches $d^2$ and $d^3$, adapted to be engaged with toothed segments $D^2$ and $D^3$, but one of which, $D^2$, is preferably secured to the frame portion, the other, $D^3$, forming a portion of the secondary lever hereinafter described, so that the main lever may be locked in whatever position it is desired to use it.

It is desirable to provide means by which the lower portion of each main lever may be vibrated independently of the upper portion. To accomplish this result, I provided a secondary lever E, which is pivoted to the same common shoulder-pivot of each of the compound levers. This secondary lever is also provided with a handle portion E' and a latch e', adapted to engage with the toothed segment D², above described. A connecting-rod E³ connects one end of the secondary lever with the lower portion d⁴ of the main lever, so that by vibrating this secondary lever independent of the main lever, the lower portion of the limb of the animal may be made to assume a desired position.

When it is desired to shift the limb of the animal from the position assumed while nailing on a shoe to that shown in dotted lines in Fig. 1, (the position assumed while clinching it,) it is necessary to vibrate the main and secondary levers simultaneously without straightening the limb. In order to do this, the latches e' of the secondary lever and d³ of the main lever are released by bearing on suitable trip-levers e⁶ and d⁶ on their respective handle portions, while the latch d², being engaged with the toothed segment D³, keeps both levers practically connected, so that by operating the handle D' of the main lever the animal's leg can be vibrated in the desired position.

To secure the operating-levers to the animal's leg, straps G G' are provided, the straps G placed above the knee of the animal, and the straps G' placed around and adjacent to the fetlock. These straps secure the animal's limbs firmly to the operating-lever, so that the limbs cannot be moved until the levers are moved. In order to secure or loosen the straps quickly, I secure one end, preferably g, (see Fig. 3,) to the operating-lever, which is bent up to form a hook, as at d⁵. (See Fig. 4.) Secured to this hook portion is a spring g', provided with a pin g², which passes through a suitable opening in the hook to engage with perforations in the strap when the same are brought to register with the opening in the hook. A bell-crank lever G², preferably made of wire, is pivoted at g³ in the hooked portion of the operating-lever, and has one free end g⁴ contacting the spring, so that by pressing down on this releasing-lever G² the spring g' is pressed outwardly, thereby carrying the engaging-pin. In this way the securing-strap may be fastened or released as desired.

In operation the frame portions are swung outwardly into the position shown in Fig. 2, the animal driven in between them, and the rear securing rod or bar C placed in position to firmly secure the frame portions together. The rear stay-rods are then secured to the frame portion, the securing-straps of the operating-levers passed around the animal's limbs and buckled in place, thus enabling the smith to operate the lever and bring the animal's limbs into the desired position for removing the shoe or setting, nailing, and clinching the new one.

The advantages of my improvement are that it provides a simple, economical, and safe apparatus to assist in shoeing horses, at the same time rendering such process less irritating to the animal and easier for the operator, in that all his attention can be concentrated on the process of repairing or setting new shoes.

While I have described my invention with more or less minuteness as regards details, I do not desire to be limited thereto unduly any more than is pointed out in the claims. On the contrary, I contemplate all proper changes in form, construction, and arrangement, the omission of parts and substitution of equivalents, as circumstances may suggest or necessity render expedient.

I claim—

1. In an apparatus for shoeing horses, &c., the combination of a supporting frame portion, a compound operative lever adapted to assume the positions of an animal's leg and pivoted thereto, means for securing the different portions of the compound lever to the limb of the animal, and means for locking the operative lever to the frame portion in any of its desired positions, substantially as described.

2. In an apparatus for shoeing horses, &c., the combination of a supporting frame portion adapted to be pivoted to a proper support, a main compound lever or levers adapted to assume the different positions of an animal's leg and pivoted to the supporting frame portion, means for securing the different portions of the compound lever to the limb of an animal, and means for locking the compound lever with the supporting frame in any of its desired positions, substantially as described.

3. In an apparatus for shoeing horses, &c., the combination of a supporting frame portion adapted to be pivoted to a proper support and made in substantially two independent bars, means for securing the bars together, means for securing the frame against vibration, a main compound lever or levers adapted to assume the different positions of an animal's leg and pivoted to the supporting frame, means for securing the different portions of the compound lever to the limb of an animal, and means for locking the compound lever with the supporting frame in any of its desired positions, substantially as described.

4. In an apparatus for shoeing horses, the combination of a supporting frame portion, a main compound lever or levers pivoted to such supporting frame and pivoted together at points corresponding to the joints of an animal, means for securing the different portions of the compound lever to the limb of an animal, a secondary lever pivoted with the main lever at a substantially common pivotal point and secured to the lower pivoted portion of the compound lever so as to operate such portion independent of the main lever, and means for locking the main and secondary levers with each other and the frame portion so that they may be operated independently or simultaneously, substantially as described.

5. In an apparatus for shoeing horses, the combination of two bars adapted to be pivoted to a proper support and forming together a supporting frame, means on such bars for positioning an animal between the same when they are swung into their operative position, means for locking the bars together, means for holding such bars in their locked position in a rigid manner, four main compound levers pivoted to the supporting frame portions, four secondary levers pivoted at common pivotal points to the main levers and the supporting frame, means for connecting the secondary levers with the lower portion of the main levers for operating the same independently, segmental racks secured to the frame portion and to the secondary levers, trip latches secured to such levers for locking the compound and secondary levers together and with the frame portion, and means for securing the different portions of the main compound lever to the limb of an animal, substantially as described.

JOHN H. JESSEN.

Witnesses:
  M. F. CHILCOTE,
  CARRIE CLARKE.